United States Patent [19]

Cole

[11] 3,950,915
[45] Apr. 20, 1976

[54] ATTACHING MEANS FOR MEMBERS AT AN ANGLE TO ONE ANOTHER

[75] Inventor: Wayne C. T. Cole, Winnipeg, Canada

[73] Assignee: Empire Sheet Metal Mfg. Co. Ltd., Winnipeg, Canada

[22] Filed: Sept. 4, 1974

[21] Appl. No.: 503,139

[52] U.S. Cl. .......................... 52/753 D; 52/753 C; 52/760; 52/586; 52/753 K
[51] Int. Cl.² .......................................... F16B 5/06
[58] Field of Search .......... 52/753 K, 753 D, 753 Y, 52/586, 753 C, 760, 285

[56] References Cited
UNITED STATES PATENTS

| | | | |
|---|---|---|---|
| 2,023,066 | 12/1935 | Curtis et al. | 52/586 |
| 2,204,675 | 6/1940 | Grunert | 52/753 K X |
| 3,664,011 | 5/1972 | Labastrou | 52/753 K |
| 3,680,898 | 8/1972 | Herrmann | 52/753 D |

Primary Examiner—Werner H. Schroeder
Assistant Examiner—Wayne L. Shedd
Attorney, Agent, or Firm—Stanley G. Ade

[57] ABSTRACT

When attaching cabinet parts together such as the sides of the cabinet to the top or bottom panels or partitions between top and bottom panels or between side panels, it is difficult to produce a firm joint particularly if particle board or plywood is used in the construction, without the use of screws, nails, glue and the like. This prevents easy assembly or disassembly and makes shipping and storage space consuming and expensive. By providing an undercut slot or recess in one part and a substantially parallel sided groove in the edge of the other part, a plastic extrusion can be used to secure the two panels together substantially at right angles to one another. The extrusion is provided with an anchoring key portion which is hammered or forced into frictional engagement within the parallel sided groove. An outwardly flanging attaching portion is formed on the underside of the anchoring portion which slidably engages axially within the undercut slot of the other panel so that lateral movement of the two panels is prevented in either direction and these two panels are held firmly together.

17 Claims, 6 Drawing Figures

ATTACHING MEANS FOR MEMBERS AT AN ANGLE TO ONE ANOTHER

BACKGROUND OF THE INVENTION

This invention relates to new and useful improvements in methods of attaching panels together such as panels of various types of furniture. Normally, side panels are secured substantially at right angles to top and bottom panels and partitions extend between the top and bottom panels and sometimes between side panels.

Normally, these are secured together by nails, glue or screws so that they are not easily assembled and disassembled. If solid wood is used, of course, tongue and groove or dovetail type joints can be used, but these are relatively expensive to form and are not satisfactory with boards made of particle board or plywood.

SUMMARY OF THE INVENTION

The present invention overcomes these disadvantages by providing an attaching means enabling one panel to be secured at an angle to the other readily and easily.

It includes a plastic extrusion having an anchoring portion which is forcibly engaged within the slot in the edge of one panel and having an outwardly flanged attaching portion which slidably engages at an undercut groove formed in one surface of the other panel so that the first panel may be slidably engaged axially within the groove and held firmly in position against lateral movement either vertically or horizontally. This permits the cabinet or other construction to be piece applicated readily and easily and shipped in a knocked-down condition whereupon it is easily re-assembled without the use of screw, nails or glue.

Furthermore, it is easily disassembled for storage or transportation if desired.

This attaching means enables the articles to be transported and stored in the minimum of space.

The principal object and essence of the invention is therefore to provide an attaching device for panels which enables one panel to be connected to another readily and easily without the use of screws, nails or glue and which furthermore is particularly suited for use with panels manufactured from particle board or plywood.

Yet another object of the invention is to provide a device of the character herewithin described which enables cabinet work or the like to be prefabricated and shipped in a knocked-down position and assembled or disassembled as desired without the use of tools or the like.

Still another object of the invention is to provide a device of the character herewithin described which permits the axial engagement of one panel with another, yet prevents lateral movement occuring between the two panels either vertically or horizontally.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Before proceeding with the description of the invention, it should be noted that the embodiments illustrated are of a substantially "dovetail" configuration. However, other configurations may of course be used and this specification should not be construed as limited the cross sectional configuration of the attaching means.

Furthermore, the attaching means are preferably manufactured from extruded plastic, but of course other materials can be used if desired.

Figure 5:
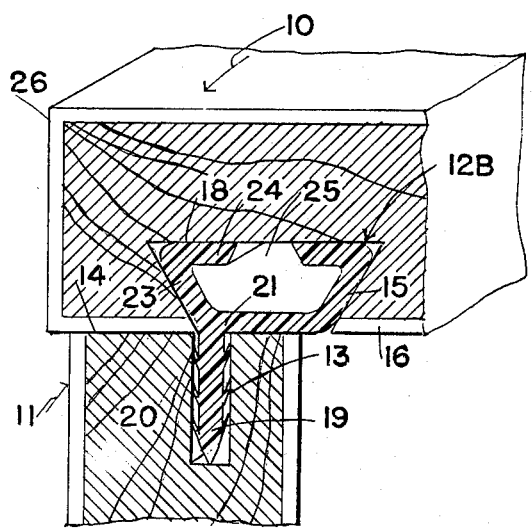
FIG. 5 is a fragmentary cross sectional view showing the first and second panels connected together by means of the attaching means illustrated in FIG. 2.
Figure 6:
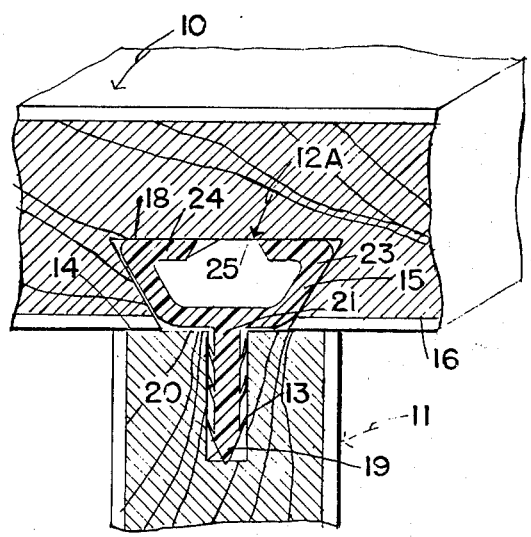
FIG. 6 is a view similar to FIG. 5, but showing the attaching means of FIG. 1.

Proceeding therefore to describe the invention in detail, reference to the accompanying drawings will show as an example, a first panel collectively designated 10 and a second panel collectively designated 11. The second panel 11 is adapted to be detachably secured at right angles to the first panel 10 as illustrated in FIGS. 5 and 6, but of course the two panels may be secured at other than a right angle if desired merely by changing the configuration of the attaching means and various grooves and slots formed in the panels.

Figure 1:
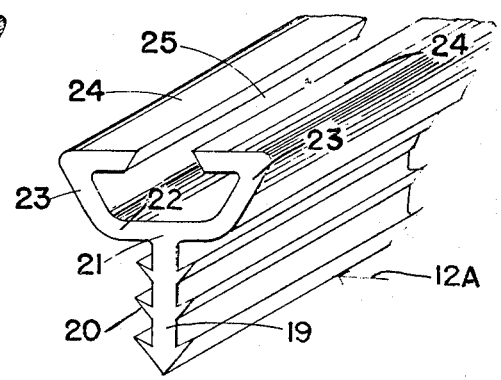
FIG. 1 is a fragmentary isometric view of one embodiment of the attaching means.
Figure 2:
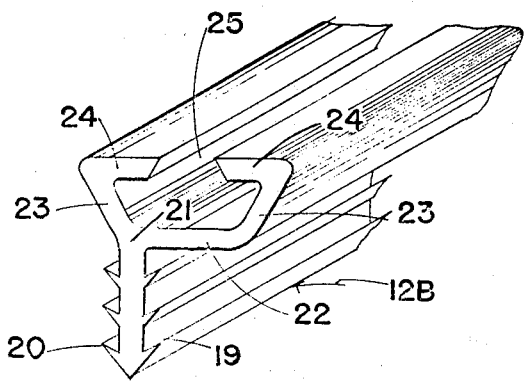
FIG. 2 is a fragmentary isometric view of an alternative embodiment of the attaching means.

The panels are detachably held together by attaching means collectively designated 12A and 12B and illustrated respectively in FIGS. 1 and 2.

Figure 3:
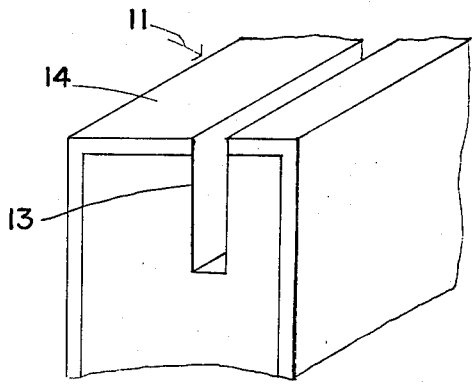
FIG. 3 is a fragmentary isometric view of one edge of one of the panels showing the anchoring slot formed therein.
Figure 4:
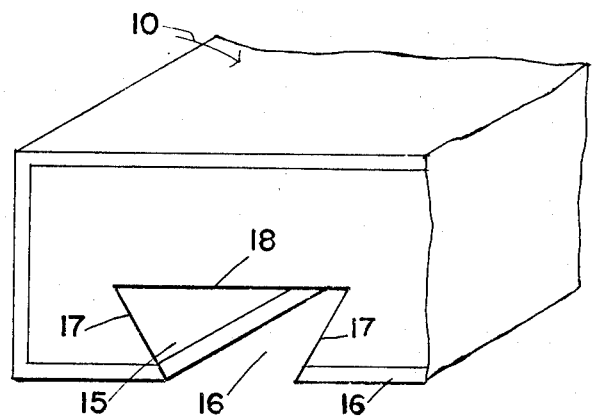
FIG. 4 is a fragmentary isometric view of the other panel to be attached to the first panel showing one embodiment of the undercut slot formed therein.

A substantially parallel sided slot or groove 13 is formed in the edge 14 of the second panel 11 as clearly shown in FIG. 3 and an undercut groove or slot 15 is formed in one surface 16 of the first panel 10 in a location where it is desired to attach the second panel.

In the present embodiment, this groove 15 is of a dovetail configuration and includes a relatively narrow open portion or slot 16 having outwardly inclined side walls 17 extending therefrom and terminating in an inner wall 18 substantially parallel to and spaced inwardly from the surface 16 of the panel upon which it is formed.

The attaching means 12A illustrated in FIGS. 1 and 6, include an elongated anchor portion 19 having a plurality of elongated ribs 20 formed upon each side thereof and terminating in an upper edge 21. These ribs extend outwardly and upwardly towards the upper edge 21 as clearly illustrated and assist in anchoring the anchor portion 19 within the substantially parallel sided slot 13.

This anchor portion is forcibly engaged within the slot and held frictionally due to the engagement of the ribs 20 with the side walls of the slot 13, the slight resiliency of the plastic assisting in this engagement.

When engaged within the slot 13, the aforementioned upper edge 21 is substantially flush with the edge 14 of the panel 11 as clearly shown in FIGS. 5 and 6.

The attaching portion of the embodiment shown in FIG. 1 includes a base portion 22 extending outwardly upon either side of the anchor portion and formed upon the upper edge 21 thereof.

Side portions 23 are formed extending outwardly and upwardly from the outer edges of the base portion 22, an upper portion 24 extend inwardly from the upper edges of the side portions 23 and terminates spaced apart from one another and lies substantially parallel to the base portion 22 as clearly illustrated. Alternatively of course the upper portions 24 can extend between the side portions 23 without the longitudinally extending space 25 therebetween. In either method of construction, the attaching portion, which is slightly wider than groove 16, can compress slightly during installation due to the aforementioned resiliency of the plastic thus giving a tight fit to the attaching portion within groove 16.

The dimensions of the outer surfaces of the attaching portion are similar to the dimensions of the groove 16 so that the attaching portion will slide axially within the groove so that the parts take up the position shown in FIG. 6. This holds the panel 11 firmly in place against panel 10 and prevents any lateral movement occuring either horizontally or vertically yet permits the axial sliding engagement hereinbefore described when it is desired to assemble or disassemble the two panels.

If it is desired to attach panel 11 close to one end 26 of panel 10, then the embodiment shown in FIG. 2 should be utilized which is similar in all respects to the embodiment shown in FIG. 1 with the exception that the attaching portion is not situated symmetrically upon the anchor portion 19.

In the embodiment shown in FIG. 2, the base 22 extends to one side of the anchor portion 19 with the side portions 23 extending upwardly and outwardly therefrom but with one side portion being positioned further to one side of the anchor portion, than the other side portion.

This enables the panels to be secured together as illustrated in FIG. 5 and prevents weakening of the edge 26 by positioning the slot or groove 15, further inwardly from the edge 26 than would be possible if the attaching means of FIG. 1 were utilized.

As mentioned previously, the cross sectional configuration of the groove or slot 15 and the attaching means may vary but it is desirable that the width of the base of the attaching portion of the extrusion be narrower than the width of the upper sides thus preventing the aforementioned lateral movement of the panels one from the other when they are secured together by the device.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In a construction which includes a first planar panel part and a second planar part detachably secured to one side of said first panel part by one edge thereof and held at an angle thereto, said first panel part having an elongated undercut slot formed in said one side thereof, said second panel part having a substantially parallel sided, elongated groove formed in said one edge thereof; an integral, one piece means detachably, rigidly securing said second panel part to said first panel part, said means comprising an elongated anchor portion elongated in cross section for substantially non-detachable, force fit frictional engagement within the substantially parallel sided groove of said second panel part and having an upper edge substantially flush with said one edge of said panel part when installed thereon, and an elongated resilient attaching portion extending longitudinally from and integral with said anchor portion on said upper edge of said anchor portion and including a base portion extending substantially transverse to and beyond each side of said anchor portion, the external cross sectional shape and dimensions of said attaching portion being similar to and slightly wider than the cross sectional shape and dimensions of said undercut slot such that said attaching portion slidably and removably engages said undercut slot axially and resiliently secures said panel parts rigidly together in a direction other than axially with respect to said undercut slot.

2. The invention according to claim 1 in which said attaching portion extends upon each side of said anchor portion substantially equidistantly and symmetrically.

3. The invention according to claim 1 in which said attaching portion extends upon either side of said anchor portion with one side extending further to one side of said anchor portion than the other side.

4. The invention according to claim 1 in which said anchor portion includes at least one longitudinally extending angulated rib formed upon the side surfaces of said anchor portion, said rib inclined outwardly and upwardly towards said upper edge of said anchor portion.

5. The invention according to claim 2 in which said anchor portion includes at least one longitudinally extending angulated rib formed upon the side surfaces of said anchor portion, said rib inclined outwardly and upwardly towards said upper edge of said anchor portion.

6. The invention according to claim 3 in which said anchor portion includes at least one longitudinally extending angulated rib formed upon the side surfaces of said anchor portion, said rib inclined outwardly and upwardly towards said upper edge of said anchor portion.

7. The invention according to claim 1 in which said elongated attaching portion includes a base portion, side portions extending upwardly from said base portion and an upper portion extending inwardly from the upper edges of said side portion, the width of said base portion being less than the width of said upper portion, said one piece securing means having a substantially Y-shape whereby said side portions of said attaching portion are resiliently urged outwardly for tightly engaging the edges defining said undercut slot of said first panel part.

8. The invention according to claim 2 in which said elongated attaching portion includes a base portion, side portions extending upwardly from said base portion and an upper portion extending inwardly from the upper edges of said side portion, the width of said base portion being less than the width of said upper portion, said one piece securing means having a substantially Y-shape whereby said side portions of said attaching portion are resiliently urged outwardly for tightly engaging the edges defining said undercut slot of said first panel part.

9. The invention according to claim 3 in which said elongated attaching portion includes a base portion, side portions extending upwardly from said base portion and an upper portion extending inwardly from the upper edges of said side portion, the width of said base portion being less than the width of said upper portion, said one piece securing means having a substantially Y-shape whereby said side portions of said attaching portion are resiliently urged outwardly for tightly engaging the edges defining said undercut slot of said first panel part.

10. The invention according to claim 7 in which said side portions extend outwardly and upwardly from the outer edges of said base portion, said upper portion comprising two members extending inwardly from the upper edges of each of said side portions substantially parallel to said base portion and spaced apart from one another.

11. The invention according to claim 8 in which said side portions extend outwardly and upwardly from the outer edges of said base portion, said upper portion comprising two members extending inwardly from the upper edges of each of said side portions substantially parallel to said base portion and spaced apart from one another.

12. The invention according to claim 9 in which said side portions extend outwardly and upwardly from the outer edges of said base portion, said upper portion comprising two members extending inwardly from the upper edges of each of said side portions substantially parallel to said base portion and spaced apart from one another.

13. Securing means for detachably securing one panel substantially at right angles to one surface of another panel, said securing means comprising an integral substantially Y-shaped one piece resilient member having an elongated anchor portion with an upper longitudinally extending edge and an elongated attaching portion extending longitudinally from and integrally connected to said upper edge and including a base portion extending substantially perpendicular to and beyond each side of said anchor portion, said attaching portion further including side portions and an upper portion, the width of said base portion being less than the width of said upper portion, the side portions extending upwardly and outwardly from the base portion edges.

14. The invention according to claim 13 in which the attaching portion extends equidistantly upon either side of said anchor portion.

15. The invention according to claim 13 in which the attaching portion extends upon one side of said anchor portion by an amount greater than said attaching portion extends upon the other side of said anchor portion.

16. The invention according to claim 13 in which said anchor portion includes at least one longitudinally extending angulated at least one rib formed upon the side surfaces of said anchor portion, said ribs inclining outwardly and upwardly towards said upper edge of said anchor portion.

17. The invention according to claim 13 in which said upper portion comprises two members extending inwardly from the upper edges of each of said portions and terminating spaced apart from one another and lying substantially parallel to said base portion, whereby said side portions of said attaching portion are resiliently urged outwardly and are compressible inwardly.

* * * * *